(12) United States Patent
Scott

(10) Patent No.: US 7,941,403 B2
(45) Date of Patent: May 10, 2011

(54) EMBEDDED FILE SYSTEM RECOVERY TECHNIQUES

(75) Inventor: Richard Curtis Scott, Vista, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 111 days.

(21) Appl. No.: 11/564,919

(22) Filed: Nov. 30, 2006

(65) Prior Publication Data
US 2008/0133614 A1 Jun. 5, 2008

(51) Int. Cl.
G06F 7/00 (2006.01)
G06F 17/00 (2006.01)

(52) U.S. Cl. ............... 707/640; 714/7; 714/16

(58) Field of Classification Search ........ 714/7
See application file for complete search history.

(56) References Cited

U.S. PATENT DOCUMENTS

| | | | |
|---|---|---|---|
| 6,845,464 B2* | 1/2005 | Gold | 714/6 |
| 6,892,288 B2* | 5/2005 | Serichol Blasco | 711/161 |
| 2001/0053192 A1* | 12/2001 | Matsu Moto et al. | 375/344 |
| 2003/0200482 A1* | 10/2003 | Sullivan | 714/25 |
| 2004/0153733 A1* | 8/2004 | Lin | 714/6 |
| 2005/0159177 A1* | 7/2005 | Trachewsky et al. | 455/522 |
| 2006/0064444 A1* | 3/2006 | van Ingen et al. | 707/204 |
| 2006/0075281 A1* | 4/2006 | Kimmel et al. | 714/5 |
| 2007/0005661 A1* | 1/2007 | Yang | 707/200 |

* cited by examiner

Primary Examiner — Cam Y T Truong
(74) Attorney, Agent, or Firm — Kacvinsky Daisak PLLC

(57) ABSTRACT

Various Embedded File System recovery techniques are described. A mobile computing device may comprise a radio, a processor coupled to the radio, and a memory coupled to the processor. The memory may be arranged to store a file system manager module (FSMM) that when executed by the processor manages an Embedded File System (EFS). The FSMM may create a factory image of the EFS on a periodic basis, or in response to a specific event such as a power down event. The FSMM may detect an error condition for the EFS, and replace the EFS with the factory image when an error is detected. Other embodiments are described and claimed.

15 Claims, 4 Drawing Sheets

Power Down Sequence

300

200

CREATE A FACTORY IMAGE OF AN EMBEDDED FILE SYSTEM FOR A RADIO
202

DETECT AN ERROR CONDITION FOR THE EMBEDDED FILE SYSTEM
204

REPLACE THE EMBEDDED FILE SYSTEM WITH THE FACTORY IMAGE WHEN THE ERROR CONDITION IS DETECTED
206

FIG. 2

EMBEDDED FILE SYSTEM RECOVERY TECHNIQUES

BACKGROUND

A mobile computing device such as a combination handheld computer and mobile telephone or smart phone generally may provide voice and data communications functionality, as well as computing and processing capabilities. In order to support various computing services, a mobile computing device may implement file system. In computing, a file system may generally refer to a set of abstract data types that are implemented for the storage, hierarchical organization, manipulation, navigation, access, and retrieval of data. Consequently, a file system is a method for storing and organizing computer files and the data they contain to make it easy to find and access them. File systems may store files using a storage device, such as memory, a hard disk or CD-ROM. Accordingly, there may be a need for improved techniques to manage EFS for a mobile computing device.

BRIEF DESCRIPTION OF THE DRAWINGS

FIG. 2 illustrates one embodiment of a first logic flow.

DETAILED DESCRIPTION

Various embodiments may be directed to improved techniques to manage a file system for an electronic device, such as a mobile computing device. In some cases, a mobile computing system may be considered an embedded system or device. An embedded system is a general term to describe a special purpose system in which a processing system such as a computer is completely encapsulated by the device it controls. To the extent a mobile computing system is implemented as an embedded system or device, a file system for the mobile computing system may be considered an Embedded File System (EFS). The embodiments, however, may apply to any type of file system and are not necessarily limited to an EFS.

More particularly, some embodiments may be directed to techniques to automatically backup and restore an EFS for a mobile computing device, such as a mobile telephone or smart phone, for example. If the EFS becomes corrupted the mobile computing device will become unstable and in some cases inoperable. As a result, a user typically attempts to return the mobile computing device to the manufacturer, which is inconvenient for the user and costly for the manufacturer. In an attempt to solve these and other problems, a mobile computing device may be arranged to periodically create a backup copy of its EFS system. The backup copy may be sometimes referred to as a factory EFS image or simply factory image. In the event of a fatal error encountered in the EFS, the mobile computing device will check for a valid factory image stored in a reserve area of memory. If a valid factory image exists, the mobile computing device will erase the corrupted EFS, and write the most recent factory image in its place. Once the corrupted EFS has been replaced, the mobile computing device may be successfully booted or re-booted to the state it was in prior to the EFS failure.

In one embodiment, for example, a mobile computing device may comprise a radio, a processor coupled to the radio, and a memory coupled to the processor. The memory may be arranged to store a file system manager module (FSMM) that when executed by the processor manages an EFS. The FSMM may create a factory image of the EFS on a periodic basis, or in response to a specific event such as a power down event or power up event. The FSMM may detect an error condition for the EFS, and replace the EFS with the factory image when an error is detected. Other embodiments are described and claimed.

Figure 1:
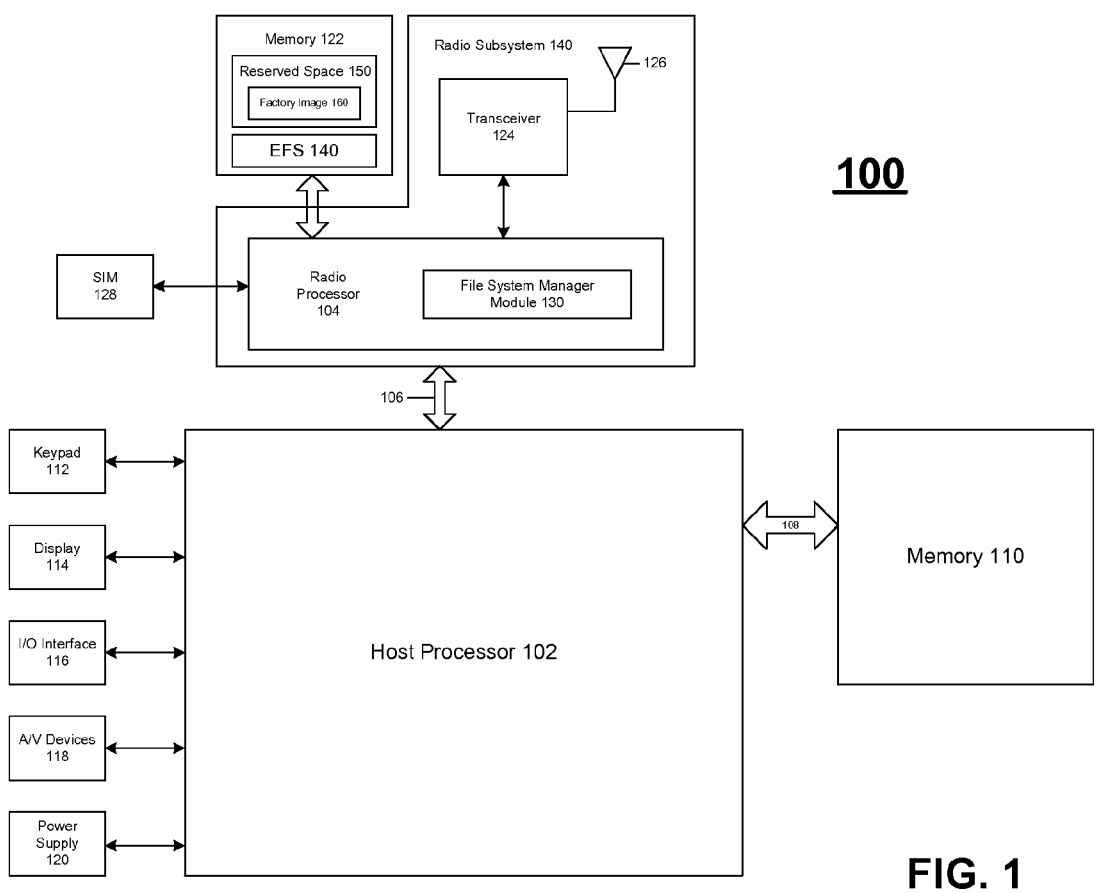
FIG. 1 illustrates one embodiment of a mobile computing device.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

In various embodiments, the mobile computing device 100 may implement one or more radios or radio subsystems. For example, the mobile computing device 100 typically includes a radio that is compatible with various types of cellular radiotelephone systems. In another example, the mobile computing device 100 typically includes a radio that is compatible with various types of wireless network systems.

In one embodiment, for example, the mobile computing device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

In addition to having one or more radios to provide wireless communications capabilities, some embodiments may implement one or more processors to provide computing capabilities. As shown in the embodiment of FIG. 1, the mobile computing device 100 may comprise a dual processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile computing device 100. The radio processor 104 may be responsible for performing various voice and data communications operations for the mobile computing device 100 such as transmitting and receiving voice and data information over one or more wireless communications channels. Although some embodiments may be described as comprising a dual processor architecture for purposes of illustration, it is worthy to note that the mobile computing device 100 may comprise any suitable processor architecture and/or any suitable number of processors consistent with the described embodiments.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The host processor 102 may also be coupled to various components, such as a keypad 112, a display 114, an input/output (I/O) interface 116, various audio/visual (A/V) devices 118, a power supply 120, and so forth. In some cases, the host processor 102 may further implement a digital interface to communicate digital signals between the host processor 102 and the various coupled components. Examples of such digital signals may include, without limitation, digital clock signals such as from an integrated circuit (IC) clock source. The digital clock signal is typically a signal used to coordinate the actions of two or more circuits. The clock signal oscillates between a high and low state, normally with a fifty percent duty cycle, and is usually a square waveform. Circuits using the clock signal for synchronization may become active at either the rising edge or falling edge, or both, of the oscillating clock signal. Consequently, the host processor 102 typically delivers a clock signal to the various components coupled to the host processor 102 in part to synchronize and control the coupled components.

The mobile computing device 100 may comprise an alphanumeric keypad 112 coupled to the host processor 102. The keypad 112 may comprise, for example, a QWERTY key layout and an integrated number dial pad. In some cases, the keypad 112 may comprise a thumbboard arranged for operation using the thumbs of a user. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise a display 114 coupled to the host processor 102. The display 114 may comprise any suitable visual interface for displaying content to a user of the mobile computing device 100. In one embodiment, for example, the display 114 may be implemented by a LCD such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an I/O interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various A/V devices 118 that support A/V capability of the mobile computing device 100. Examples of A/V devices 114 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a transceiver module 124 coupled to the radio processor 104. The transceiver module 124 may comprise one or more radio transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services. It may be appreciated that the term "transceiver" as used herein may describe a transmitter, a receiver, or both a transmitter and receiver.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

The mobile computing device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

The mobile computing device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile computing device 100. For example, the host processor 102 may be responsible for executing various software programs such as system programs and application programs to provide computing and processing operations for the mobile computing device 100.

System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As shown in FIG. 1, the mobile computing device 100 may comprise or implement a FSMM 130 arranged to manage an EFS 140 for the mobile computing device 100. The FSMM 130 may be implemented as part of the radio processor 104 (as shown), or separate from the radio processor 104 (e.g., host processor 102), as desired for a given implementation. Further, the FSMM 130 may be implemented in hardware, software, or a combination of hardware and software, as desired for a given implementation. The embodiments are not limited in this context.

In various embodiments, the FSMM 130 may be arranged to automatically backup and restore the EFS 140 for the mobile computing device 100. If the EFS 140 becomes corrupted, the mobile computing device 100 will become unstable and in some cases inoperable. The mobile computing device 100 may therefore be arranged to create a backup copy of the EFS 140, referred to herein as a factory image 160. In the event of a fatal error encountered in the EFS 140, the mobile computing device 100 will check for a valid factory image 160 stored in a reserve area 150 of the memory 122. If a valid factory image 160 exists, the mobile computing device 100 will erase the corrupted EFS 140, and write the factory image 160 in its place. Once the corrupted EFS 140 has been replaced, the mobile computing device 100 may be successfully booted or re-booted to the state it was in prior to the failure of the corrupted EFS 140.

Operations for the mobile computing device 100 and/or the FSMM 130 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using any desired hardware elements, software elements, or combination of both.

FIG. 2 illustrates a logic flow 200. Logic flow 200 may be representative of the operations executed by one or more embodiments described herein. The logic flow 200 may be performed by various systems and/or devices and may be implemented as hardware, software, and/or any combination thereof, as desired for a given set of design parameters or performance constraints. For example, the logic flow 200 may be implemented by a logic device (e.g., processor) and/or logic comprising instructions, data, and/or code to be executed by a logic device. For purposes of illustration, and not limitation, the logic flow 200 is described with reference to FIG. 1. The embodiments, however, are not limited in this context.

As shown in FIG. 2, in one embodiment logic flow 200 may create a factory image (160) of an EFS (140) for a radio (140) at block 202. Logic flow 200 may detect an error condition for the EFS at block 204. Logic flow 200 may replace the EFS with the factory image when the error condition is detected. The embodiments are not limited in this context.

In one embodiment, for example, the FSMM 130 may be arranged to manage an EFS, such as the EFS 140 stored and implemented using memory 122. The EFS 140 may comprise a file system having a set of abstract data types that are implemented for the storage, hierarchical organization, manipulation, navigation, access, and retrieval of data. Consequently, the EFS 140 is a system, apparatus and method for storing and organizing electronic files and electronic data within the electronic files in a manner that makes the files and data accessible to a system or user.

In one embodiment, for example, the EFS 140 may comprise any EFS suitable for the power and form factor requirements of the mobile computing device 100. In one embodiment, for example, the memory 122 may comprise a flash memory unit having various amounts of memory space. In one embodiment, for example, the memory 122 may comprise a flash memory unit with 32 Megabytes (MB), 64 MB, and so forth. In this case, the EFS 140 may comprise any number of electronic files and file data stored using the available memory space of the flash memory 122.

In various embodiments, the FSMM 130 may be arranged to create a factory image 160 of the EFS 140. The factory image 160 may comprise any type of information or data that may be used to restore, replace or recreate the EFS 140. In some cases, for example, the factory image 160 may represent a backup copy of the EFS 140. A backup copy typically refers to the copying of data so that these additional copies may be restored after a data loss event. Backups are useful to restore the EFS 140 of the mobile computing device 100 to an operational state following an error condition, and restore some or all of the files after they have been accidentally deleted or corrupted. As shown in FIG. 1, the factory image 160 may be stored in the memory 122. Alternatively, the factory image 160 may be stored using other memory elements available to the mobile computing device 100, such as the memory 110, the SIM 128, an SD card, offline storage, online storage (e.g., a network server), and so forth. The embodiments are not limited in this context.

In one embodiment, for example, the factory image may be created on a periodic basis. In various embodiments, the FSMM 130 may create the factory image 160 of the EFS 140 on a periodic basis or regular intervals, such as every X number of minutes when the mobile computing device 100 is placed in a powered state. Alternatively, the FSMM 130 may also create the factory image of the EFS 140 in response to a system event, such as when the mobile computing device 100 is placed in an unpowered state. For example, the FSMM 130 may be programmed to automatically create the factory image 160 upon removal or shut down of power from the power supply 120, such as during a power down event or sequence. In another example, the FSMM 130 may be programmed to automatically create the factory image 160 upon application of power from the power supply 120, such as during a power up event or sequence. The FSMM 130 may also be arranged to manually create the factory image 160 in response to user commands. These various options may be configured by a user via I/O interface 116, or with default settings.

In the event more than one copy of the factory image 160 is created, the FSMM 130 may be arranged to manage the multiple copies of the factory image 160 using any number of file management techniques. For example, the FSMM 130 may use different version numbers to keep track of a most recent factory image 160. In another example, the FSMM 130 may use various types of metadata to keep track of various factory images 160, such as a date, a time, a date and time, a version number, a copy number, a user identifier (ID), a login ID, and so forth. In some cases, the FSMM 130 may store a second factory image 160 to a second set of storage media, such as memory 110. For example, if the one or more physical storage locations of the memory 122 fails or becomes inoperative, the factory image 160 may be used to restore the EFS 140 to a different memory resource for the mobile computing device 100, such as the memory 110 or SIM 128, for example. This can also be done to rearrange the backup images to optimize restore speed, or to have a second copy for safe keeping in a different location or on a different storage medium. The embodiments are not limited in this context.

In one embodiment, for example, the EFS may be compressed when creating the factory image. Since the factory image 160 contains at least one copy of all data worth saving for the EFS 140, the data storage requirements may be considerable. For example, if memory 122 can store 32 MB worth of data, then the factory image 160 needs to save up to 32 MB worth of data to make a proper backup copy for the EFS 140. To reduce storage requirements, however, the FSMM 130 may be arranged to implement various data compression techniques to compress data for the EFS 140 in order to reduce or conserve memory space consumed by the factory image 160. The FSMM 130 may implement or use any data compression or source coding algorithm capable of encoding information using fewer bits (or other information-bearing units) than an unencoded representation would otherwise use without the encoding scheme. The embodiments are not limited in this context.

In one embodiment, for example, the factory image may be encrypted. To reduce security risks, the FSMM 130 may implement various encryption techniques to encrypt the factory image 160. This may prevent access to the factory image 160 from unauthorized access. This may be particularly desirable, for example, when the factory image 160 is stored on removable media (e.g., SIM 128 or an SD card), or on a separate device (e.g., PC or network server).

In one embodiment, for example, the factory image may be stored in a reserved area or space of a flash memory unit. In various embodiments, the FSMM 130 may create the factory image 160, and store the factory image 160 in a reserved space 150 of the memory 122. By storing the factory image 160 in the reserved space 150, there is a reduced chance of the same error condition that corrupted the EFS 140 to also corrupt the factory image 160. Further, this also reduces or eliminates the risk of the FSMM 130 accidentally writing over data for the factory image 160 during the normal course of file management operations for the EFS 140, or when deleting or erasing the EFS 140 in preparation of replacing or restoring the EFS 140 with the factory image 160.

In one embodiment, for example, the factory image may be stored by a server. In addition to storing the factory image 160 in different memory units available to the mobile computing device 100, some embodiments may store the factory image 160 in a device separate from the mobile computing device 100. For example, the FSMM 130 may create the factory image 160, and transmit the factory image 160 to another device such as a computer used to synchronize data with the mobile computing device 100. In another example, the FSMM 130 may transmit the factory image 160 to a server or other online network storage device. The FSMM 130 may transmit the factory image to the target device via the transceiver 124 of the radio subsystem 140, or any other radios available to the mobile computing device 100 (e.g., a WiFi transceiver, Bluetooth transceiver, and so forth). Upon detection of an error condition, the FSMM 130 may retrieve the factory image 160 from the off-site storage system, and restore the EFS 140 with the retrieved factory image 160.

In one embodiment, for example, the FSMM 130 may be arranged to detect an error condition by monitoring power cycles for the radio. When the EFS 140 becomes corrupted, other components relying upon data from the EFS 140 may hang or suspend operation of the mobile computing device 100. In some cases, internal timers may be used to determine when to reboot the system in an attempt to re-initialize the system. The FSMM 130 may be arranged to monitor such power cycles, and implement the EFS 140 backup operations after a predetermined number of power cycles. Alternatively, the FSMM 130 may be arranged with one or more timers to trigger the EFS 140 backup operations. The embodiments are not limited in this context.

In one embodiment, for example, the FSMM 130 may be arranged to detect an error condition by performing periodic checks of data integrity. For example, the FSMM 130 may read a data sample from a file in the EFS 140, compare the requested data sample with a defined data sample, and detect the error condition when the requested data sample does not match the defined data sample.

Once the FSMM 130 detects an error condition, the FSMM 130 may attempt to repair, replace or restore the EFS 140 using data from the factory image 160. In one embodiment, for example, the FSMM 130 may completely delete all the files managed by the EFS 140, and write corresponding files from the factory image 160 to the memory 122. In one embodiment, for example, the FSMM 130 may attempt to replace only those files that have been actually corrupted. In one embodiment, for example, the FSMM 130 may attempt to restore one or more corrupted files, rather than replacing the entire EFS 140. Once repaired, replaced or restored, the FSMM 130 may request a reboot of the mobile computing device 140 to instantiate the new EFS 140.

Figure 3:
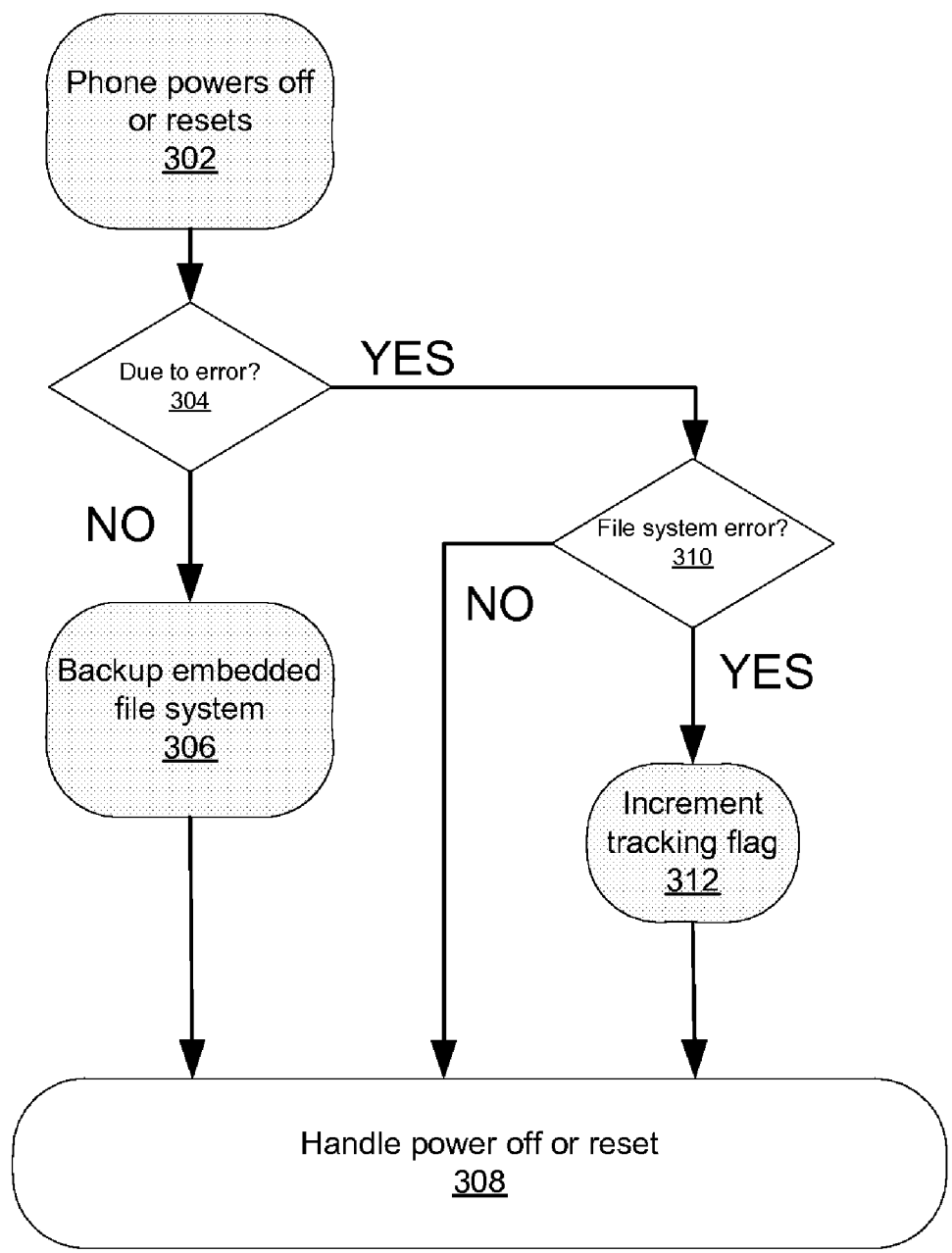
FIG. 3 illustrates one embodiment of a second logic flow.

FIG. 3 illustrates one embodiment of a second logic flow. FIG. 3 illustrates a logic flow 300. Logic flow 300 may represent operations performed by the mobile computing device 100 and/or FSMM 140 during a power down sequence for the mobile computing device 100. More particularly, logic flow 300 provides an example of a technique used for creating the factory image 160 during power off or reset operations. The embodiments, however, are not limited to this example logic flow.

As shown in FIG. 3, a situation may occur where the phone powers off or resets at block 302. Logic flow 300 determines whether the power off condition or reset condition is caused by an error condition at block 304. If the power off condition or reset condition is not caused by an error condition at block 304, then logic flow 300 initiates backup operations to backup the EFS 140 to create the factory image 160. Logic flow 300 then proceeds to handle the power off or reset operations at block 308.

If the power off condition or reset condition, however, is caused by an error condition at block 304, then logic flow 300 determines whether the error condition is an error condition for a file or files from a corrupted EFS 140. If the error condition is an error condition for the EFS 140, then logic flow 300 increments a tracking flag at block 312. Logic flow 300 then passes control to block 308. If the error condition is not an error condition for the EFS 140, however, then logic flow 300 passes control directly to block 308.

Figure 4:
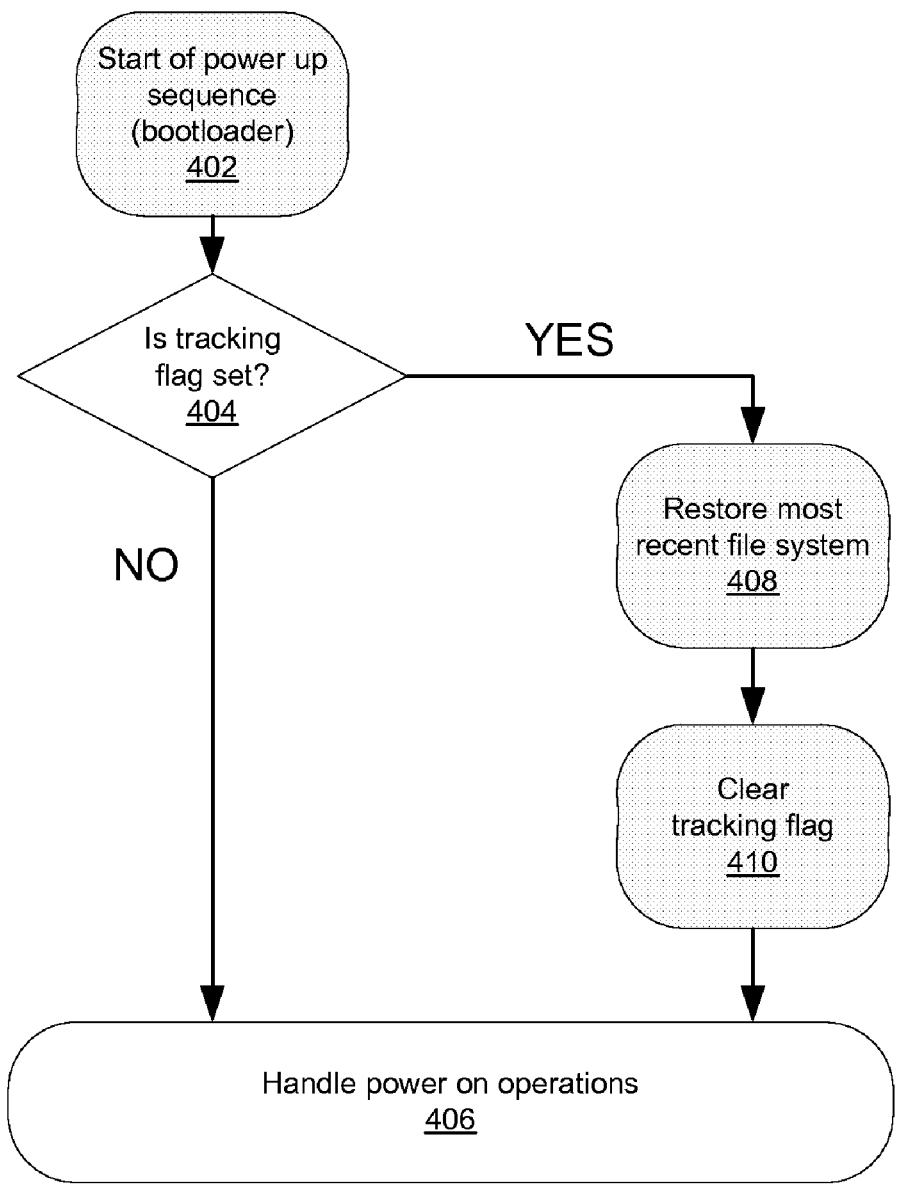
FIG. 4 illustrates one embodiment of a third logic flow.

FIG. 4 illustrates one embodiment of a third logic flow. FIG. 4 illustrates a logic flow 400. Logic flow 400 may represent operations performed by the mobile computing device 100 and/or FSMM 140 during a power up sequence for the mobile computing device 100. More particularly, logic flow 400 provides an example of a technique used for creating the factory image 160 during power up operations. The embodiments, however, are not limited to this example logic flow.

As shown in FIG. 4, logic flow 400 begins with initiation of a power up sequence at block 402. For example, the power up sequence may be performed by a boot loader system program comprising part of the system OS, typically stored in firmware. Logic flow 400 may determine whether a tracking flag is set at block 404. If the tracking flag is not set at block 404, logic flow 400 may handle subsequent power on operations at block 406. If the tracking flag is set at block 404, however, logic flow 400 may retrieve and restore the most recent copy of the factory image 160 to replace one or more files of the EFS 140 at block 408. Logic flow 400 may clear the tracking flag at block 410, and pass control to block 406 to handle subsequent power up operations.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some embodiments may be implemented as an article of manufacture. The article of manufacture may include a storage medium to store logic and/or data for performing various operations of one or more embodiments. The storage medium may represent any storage media capable of storing data or information, such as volatile or non-volatile memory, removable or non-removable memory, erasable or non-erasable memory, writeable or re-writeable memory, and so forth. Examples of storage media may include, without limitation, those examples as previously provided for memory units. In various embodiments, for example, the article of manufacture may comprise a magnetic disk, optical disk, flash memory or firmware containing computer program instructions suitable for execution by a general purpose processor or application specific processor. The embodiments, however, are not limited in this context.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the embodiments.

The invention claimed is:

1. A mobile computing device, comprising:
a radio;
a processor coupled to said radio;
a memory coupled to said processor, said memory to store a file system manager module that when executed by said processor manages an Embedded File System, said file system manager module to create a factory image of said Embedded File System during a power off or reset condition when the power off or the reset condition is not caused by an error condition, store said factory image in a reserved area of said memory, detect the error condition for said Embedded File System by reading a requested data sample from a file in said Embedded File System and comparing said requested data sample with a defined data sample and detecting said error condition when said requested data sample does not match said defined data sample, replace said Embedded File System with said factory image when an error is detected, and request a reboot of said mobile computing device to instantiate said Embedded File System stored by said factory image once said Embedded File System has been replaced; and wherein said file system manager module to detect said error condition by monitoring power cycles for said radio, and wherein said file system manager module to compress said Embedded File System when said factory image is created.

2. The mobile computing device of claim 1, said memory comprising flash memory.

3. The mobile computing device of claim 1, said file system manager module to delete all files managed by said Embedded File System, and write corresponding files from said factory image.

4. The mobile computing device of claim 1, comprising a thumbboard to access said Embedded File System and input information to a file for said Embedded File System.

5. The mobile computing device of claim 1, comprising a touch screen display to output information from said Embedded File System.

6. The mobile computing device of claim 1, each power cycle comprising a re-initialization of said mobile computing device when said radio causes said mobile computing device to suspend operations for a time period determined by an internal timer, said file system manager module to replace said Embedded File System with said factory image after a predetermined number of power cycles.

7. A method, comprising:
creating a factory image of an Embedded File System for a radio during a power off or reset condition when the power off or the reset condition is not caused by an error condition;
storing said factory image in a reserved area of a flash memory unit;
detecting the error condition for said Embedded File System by reading a requested data sample from a file in said Embedded File System and comparing said requested data sample with a defined data sample and detecting said error condition when said requested data sample does not match said defined data sample;
replacing said Embedded File System with said factory image when said error condition is detected; and
requesting a reboot of a device having said radio to instantiate said Embedded File System stored by said factory image once said Embedded File System has been replaced;
wherein detecting an error condition comprises detecting the error condition by monitoring power cycles of said radio; and
wherein the creating the factory image comprises compressing said Embedded File System.

8. The method of claim 7, comprising creating said factory image on a periodic basis.

9. The method of claim 7, comprising storing said factory image by a server.

10. The method of claim 7, each power cycle comprising a re-initialization of said mobile computing device when said radio causes said mobile computing device to suspend operations for a time period determined by an internal timer, said file system manager module to replace said Embedded File System with said factory image after a predetermined number of power cycles.

11. A non-transitory computer-readable storage medium comprising instructions that if executed enable a computing system to:
create a factory image of an Embedded File System for a radio during a power off or reset condition when the power off or the reset condition is not caused by an error condition;
store said factory image in a reserved area of a flash memory unit;
detect the error condition for said Embedded File System by monitoring power cycles of said radio, and by reading a requested data sample from a file in said Embedded File System and comparing said requested data sample with a defined data sample and detecting said error condition when said requested data sample does not match said defined data sample;
replace said Embedded File System with said factory image when said error condition is detected; and
request a reboot of a device having said radio to instantiate said Embedded File System stored by said factory image once said Embedded File System has been replaced;
wherein the creating the factory image comprises compressing said Embedded File System.

12. The storage medium of claim 11, further comprising instructions that if executed enable a computing system to create said factory image on a periodic basis.

13. The storage medium of claim 11, further comprising instructions that if executed enable a computing system to store said factory image by a server.

14. The storage medium of claim 11, each power cycle comprising a re-initialization of said mobile computing device when said radio causes said mobile computing device to suspend operations for a time period determined by an internal timer, said file system manager module to replace said Embedded File System with said factory image after a predetermined number of power cycles.

15. A mobile computing device, comprising:
a radio;
a processor coupled to said radio;
a flash memory coupled to said processor, said memory to store a file system manager module that when executed by said processor manages an Embedded File System, said file system manager module to create a factory image of said Embedded File System during a power off or reset condition when the power off or the reset condition is not caused by an error condition, store said factory image in a reserved area of said memory, detect the error condition for said Embedded File System, replace said Embedded File System with said factory image when an error is detected, and request a reboot of said mobile computing device to instantiate said Embedded File System stored by said factory image once said Embedded File System has been replaced; and
said file system manager module to periodically detect said error condition by periodically reading a requested data sample from a file in said Embedded File System, periodically comparing said requested data sample with a defined data sample, and detecting said error condition when said requested data sample does not match said defined data sample;
wherein said file system manager module to detect said error condition by monitoring power cycles for said radio; wherein the creating a factory image comprises compressing said Embedded File System.

* * * * *